United States Patent [19]

Brams

[11] Patent Number: 5,145,694

[45] Date of Patent: Sep. 8, 1992

[54] APPARATUS FOR THE PLASTIFYING OF THERMOPLASTIC SYNTHETIC RESINS

[75] Inventor: Peter Brams, Munich, Fed. Rep. of Germany

[73] Assignee: Krauss-Maffei Aktiengesellschaft, Munich, Fed. Rep. of Germany

[21] Appl. No.: 736,722

[22] Filed: Jul. 26, 1991

[30] Foreign Application Priority Data

Jul. 28, 1990 [DE] Fed. Rep. of Germany ....... 4024070

[51] Int. Cl.$^5$ ................. B29C 45/74; B29C 47/80
[52] U.S. Cl. ..................... 425/174.8 R; 425/174.8 E; 425/550; 264/26
[58] Field of Search ................... 264/25, 26; 425/174, 425/174.8 R, 174.8 E, 547, 550

[56] References Cited

U.S. PATENT DOCUMENTS

| 2,370,883 | 3/1945 | Smith | 425/174.8 R |
| 2,386,966 | 10/1945 | MacMillin | 425/174.8 R |
| 2,436,999 | 3/1948 | MacMillin et al. | 264/26 |
| 2,505,602 | 4/1950 | Bertrand | 425/174.8 R |
| 2,608,637 | 8/1952 | Dakin et al. | 425/174.8 R |
| 4,546,226 | 10/1985 | Trembley et al. | 425/174.8 E |

FOREIGN PATENT DOCUMENTS

| 739925 | 10/1943 | Fed. Rep. of Germany . |
| 884061 | 7/1953 | Fed. Rep. of Germany . |
| 1921065 | 11/1970 | Fed. Rep. of Germany . |
| 1928676 | 6/1972 | Fed. Rep. of Germany . |
| 2059496 | 12/1972 | Fed. Rep. of Germany . |
| 2049600 | 6/1973 | Fed. Rep. of Germany . |
| 2947486 | 6/1981 | Fed. Rep. of Germany . |
| 3341032 | 8/1984 | Fed. Rep. of Germany . |
| 8430143 | 1/1985 | Fed. Rep. of Germany . |
| 3540024 | 5/1986 | Fed. Rep. of Germany . |
| 60-925 | 1/1985 | Japan . |
| 589148 | 6/1947 | United Kingdom . |

Primary Examiner—Jay H. Woo
Assistant Examiner—James P. Mackey
Attorney, Agent, or Firm—Herbert Dubno

[57] ABSTRACT

A plastifying worm for an extruder or injection-molding system utilizes a worm cylinder and a worm or worm core as outer and inner electrodes to which high-frequency energy is applied for direct high-frequency dielectric heating of a thermoplastic synthetic resin. Between the electrodes is disposed an insulator.

13 Claims, 2 Drawing Sheets

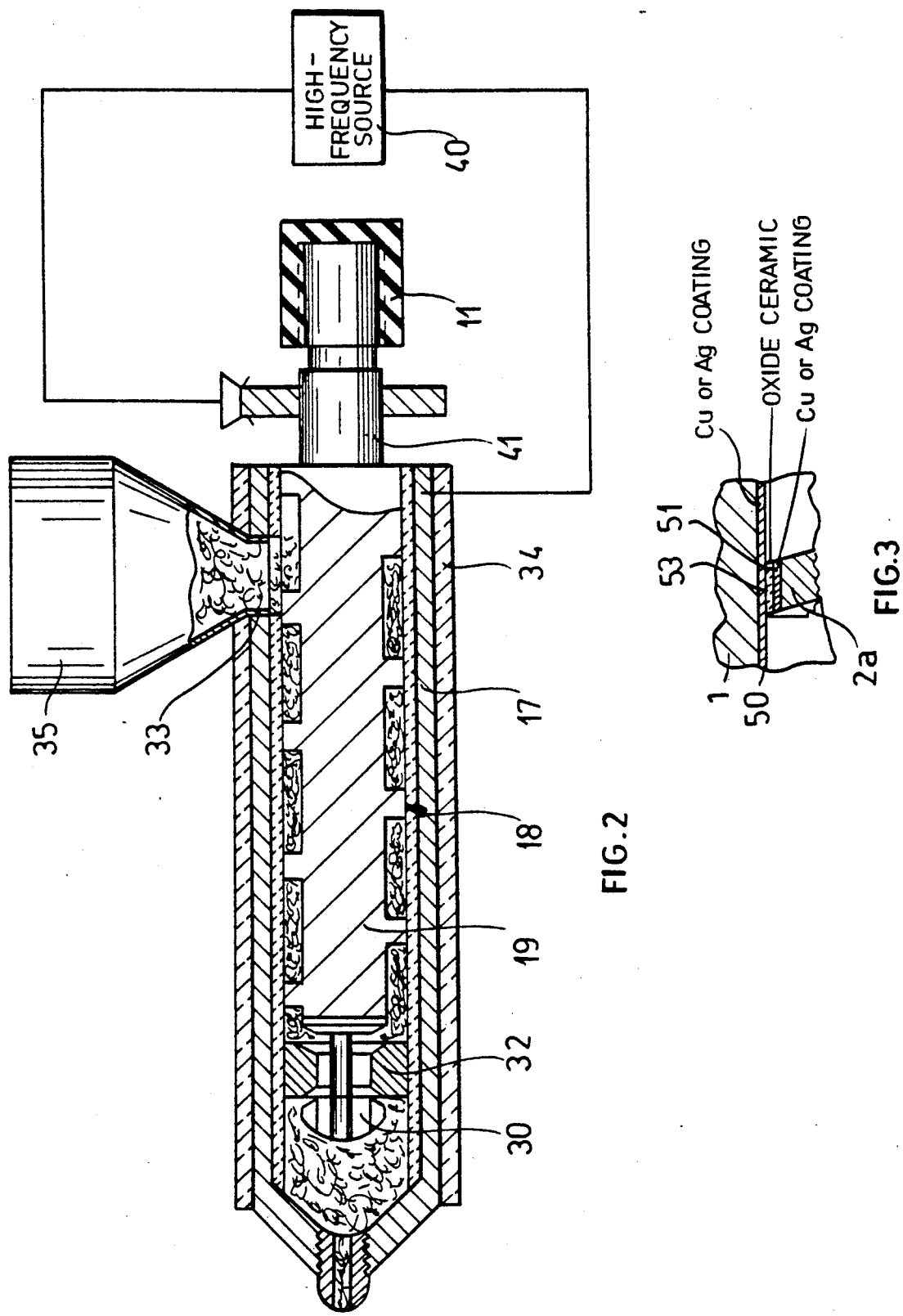

APPARATUS FOR THE PLASTIFYING OF THERMOPLASTIC SYNTHETIC RESINS

FIELD OF THE INVENTION

My present invention relates to an apparatus for plastifying thermoplastic synthetic resins and, more particularly, to a worm-type plastifying apparatus in which a thermoplastic synthetic resin is subjected to heat and mechanical action between an inlet and an outlet, in the course of which the mass of the thermoplastic synthetic resin is plastified.

BACKGROUND OF THE INVENTION

For the plastification of thermoplastic materials, i.e. the conversion of a heterogeneous mass, e.g. of powder, granules, scraps or pieces, to a liquid, it is common to carry out a heating and mechanical action which ultimately will melt and form a homogeneous molten mass of the thermoplastic material.

For this purpose an extruder having a worm cylinder and a worm may be used, the worm effecting a mastication, kneading and shear action upon the synthetic resin which, in conjunction with heating, effects the thermoplastification.

The cylinder can be heated, in prior art arrangements of this type, by electrical resistance heaters. German open application DE-OS 35 40 024, for example, demonstrates that it is also known to provide the cylinder with passages running parallel to the axis and traversed by a heating fluid for such heating purposes. These heating passages can be closed at their ends and interconnected by manifold passages which are transverse to these longitudinal passages.

The thermoplastic synthetic resin generally is a poor thermal conductor and thus heat transfer through the wall of the cylinder or from resistance heaters disposed in heat-exchange relationship therewith requires a large contact surface between the heated surface and the injection molding mass, to effect a rapid and uniform heating. As a consequence, when rapid, brief heating of a mass of thermoplastic synthetic resin is required, relatively long, rapidly operating worms and worm cylinders are required to provide the desired contact surface. Such apparatus is relatively expensive, requires high driving powers to rotate the worm or worms, and is subject to significant wear, thereby necessitating frequent maintenance. The significant shear effect can result in uncontrolled overheating which, together with the excessive abrasive action and wear, can be detrimental to transparent plastics and can result in excessive noise in the workplace.

OBJECTS OF THE INVENTION

It is, therefore, the principal object of the present invention to provide a plastifying worm arrangement, which, with relatively short worm and worm cylinders, can rapidly and uniformly heat and plastify a thermoplastic synthetic resin.

Another object of the invention is to provide an improved apparatus for the plastification of such resins whereby drawbacks of earlier systems are avoided.

It is still another object of the invention to provide a system for heating the thermoplastic synthetic resin which can prevent overheating and excessive shear effects.

SUMMARY OF THE INVENTION

These objects are attained, in accordance with the invention, in an apparatus for plastifying a thermoplastic synthetic resin which comprises:

an extruder having a worm cylinder formed with an inlet for receiving a thermoplastic synthetic resin to be plastified and, spaced from the inlet, an outlet for discharging plastified thermoplastic synthetic resin;

a worm received in the cylinder and rotatable therein to plastify the thermoplastic synthetic resin and displace the thermoplastic synthetic resin from the inlet to the outlet; and means for high-frequency heating of the thermoplastic synthetic resin between the inlet and the outlet.

More specifically, I use the worm or a core or shaft thereof as an inner electrode and the cylinder as an outer electrode of a high-frequency dielectric heating system with the thermoplastic synthetic resin mass disposed between these electrodes being directly heated by the dielectric heating action. Heat transfer through surfaces in contact with the synthetic resin is no longer relevant.

According to a feature of the invention, a worm or core shaft forms the inner electrode while the outer electrode is formed between the worm cylinder and at least one of the electrodes is lined or coated with an electrical insulator which can be an oxide ceramic. Across these electrodes, therefore, I can apply a high-power source, for example, of an amplitude of 100 KVA at a high frequency of say, 27.12 MHz to generate a high-frequency field which, with a residence time of only several seconds from beginning to end of the plastificating process, can directly heat the thermoplastic synthetic resin mass.

The heated mass can thus be brought to the thermoplastified state in very short periods of time, and can allow a rapid cycling of the apparatus when it is used as an injector for injection molding thermoplastic synthetic resin. The thermoplastic synthetic resins which can be used under these conditions include the polyolefins, for example, polyethylene. The outer portion or body of the worm, a coating on the worm, an internal coating of the worm cylinder or a sleeve lining with cylinder may be composed of the insulator which, as noted, is an oxide ceramic. Suitable oxide ceramics include silicon dioxide, aluminum oxide, magnesium oxide, zirconium oxide, titanium dioxide and composites thereof.

To improve the conductivity of the electrodes, they may be advantageously copper-coated or silver-coated. This ensures an increased effectivity of the electrode area and allows a smaller contact area between the electrodes and the synthetic resin mass for a given heating effect.

The uniform heating of the injection molding mass by the high frequency reduces the stress on the material by the kneading and shear effects and has been found to be especially effective with thermoplastic synthetic resin compositions containing reinforcing fibers, for example, glass fibers or graphite fibers.

BRIEF DESCRIPTION OF THE DRAWING

The above and other objects, features and advantages of the present invention will become more readily apparent from the following description, reference being made to the accompanying drawing in which:

FIG. 2 is a similar cross sectional view of a second embodiment of the invention; and FIG. 3 is a detail section of the walls of the cylinder and worm illustrating another aspect of the invention.

SPECIFIC DESCRIPTION

Figure 1:
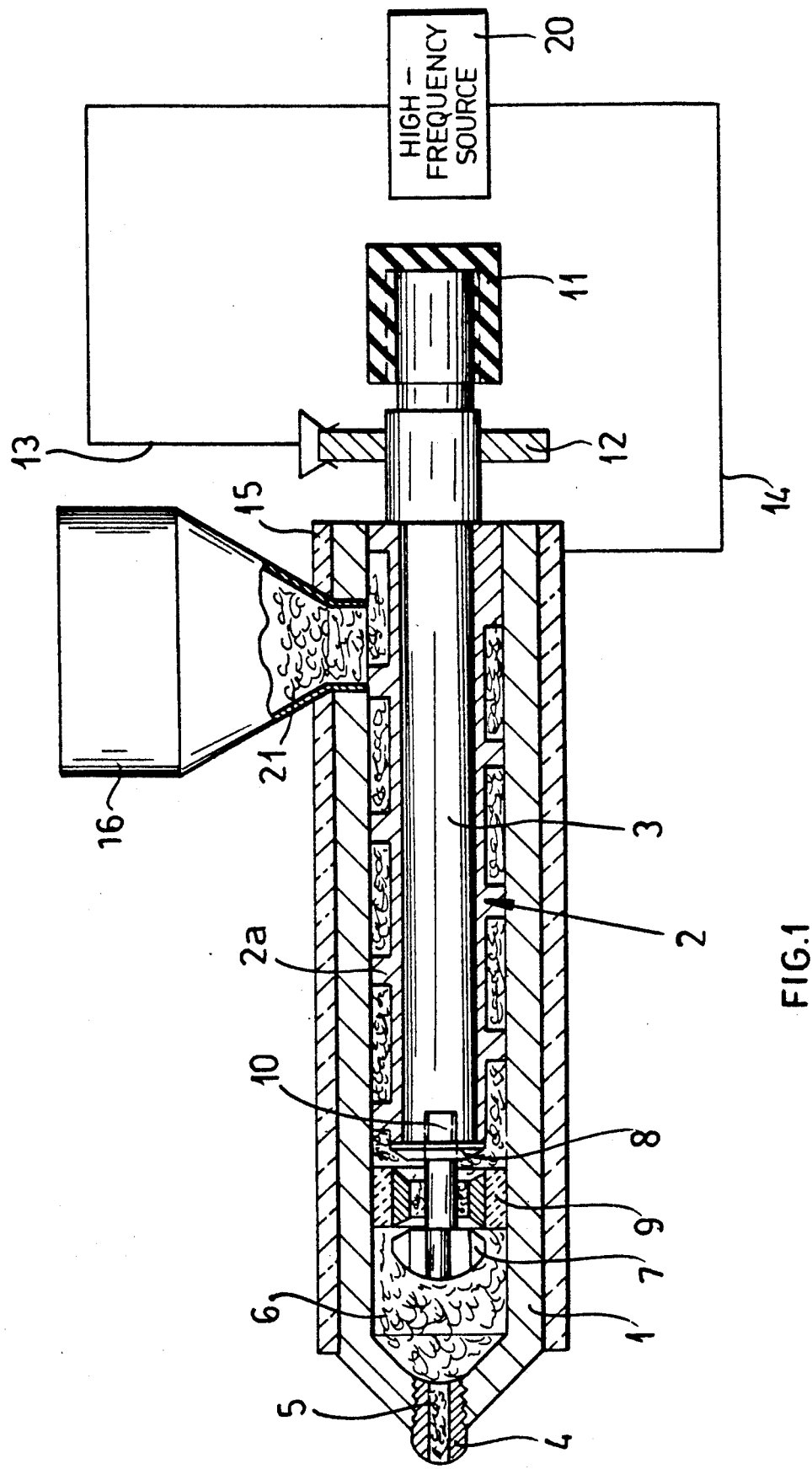
FIG. 1 is an axial cross sectional view through a plastification apparatus of the invention in accordance with one embodiment.

FIG. 1 shows a worm cylinder 1 composed of metal, e.g. steel, in which a worm body 2 is rotatable by a motor (not shown), the worm body having a rib forming a helical flight for displacing a thermoplastic synthetic resin from an inlet at one end provided with a funnel 16 to outlet 4 at an opposite end.

The device shown forms an extruder for the thermoplastic synthetic resin mass and, where the worm is axially displaceable, the outlet 4 ca be an injection nozzle and the plastifying apparatus can be used for the injection molding of the thermoplastic mass in a mold.

The injection passage 5 communicates with the head 6 of the injection-molding extruder and the latter is formed with a slide ring 9 of electrical insulating material separating the head 6 from the plastifying portion of the cylinder upstream thereof. A check valve 7 is provided at this ring 9 to prevent backflow of the thermoplastic material when the worm is axially displaced to force the thermoplastified material into an injection mold. The sealing ring 8 can also cooperate with the slide ring 9 for the injection-molding operation.

The sealing ring 8 is connected by a threaded bolt 10 rigidly with the worm.

The rear end of the worm shaft 3 is provided with an insulating entraining sleeve 11 connected with the motor and the means for axially displacing the worm in the injection operation. The entrainer 11 may be composed of an oxide ceramic. The shaft 3 also carries a ring electrode 12 or slip ring with which a conductor 13 is connected and which, in turn, connects one pole of the high-frequency source 20, which here forms the inner electrode.

Another conductor 14 connects another pole of the high-frequency source 20 to the worm cylinder 1 forming the outer electrode. In the embodiment shown in FIG. I, the body 2 of the worm, coupled to the shaft 3 by a key (not shown), is formed with the flight or helical rib 2a and is composed of the oxide ceramic constituting the insulator. A ceramic fabric sheath 15 surrounds the worm cylinder 1 as a thermal insulation.

In operation, therefore, as the thermoplastic synthetic resin 21 fed by the funnel 16 to the worm cylinder is advanced along the latter, the high-frequency field between the electrodes and across the body 2 dielectrically heats the thermoplastic synthetic resin directly so that the combined action of the heat and the kneading by the worm 2, 3 transforms the synthetic resin material into the molten liquid which is injected into the injection mold as described. The energy applied is approximately 100 KVA at the frequency of 27.12 MHz mentioned earlier.

In FIG. 2 I have shown a worm cylinder 17 which is internally lined by a sleeve 18 of the oxide ceramic. The sleeve 18 surrounds a worm 19 which is formed at its forward end with a check valve 30. The worm 19 is axially movable with a slide ring 21 in the sleeve 18. The worm cylinder 17 and sleeve 18 are provided with a bore 33 through which the raw material is supplied to the worm from a hopper 35. The cylinder 17 is surrounded by a ceramic fabric 34 serving as thermal insulation. The high-frequency source 40 is connected to the worm 19 at its shaft 41 by a slip ring arrangement as previously described, and to the worm cylinder 17. The apparatus of FIG. 2 operates in the same manner as that of FIG. 1 except that the oxide ceramic insulation her lines the cylinder rather than forming part of the worm.

In FIG. 3 I have shown that the cylinder 1 (or 17) may be provided with a copper or silver coating 50 and that the flight 2a of the worm may be provided with a copper or silver coating 51 to form highly conductive areas of the two electrodes. In this embodiment, the oxide ceramic coating 53 is provided on the metal worm flight 2a which forms the inner electrode.

I claim:

1. An apparatus for plastifying a thermoplastic synthetic resin, said apparatus comprising:

an extruder having a worm cylinder formed with an inlet for receiving a thermoplastic synthetic resin to be plastified and, spaced from said inlet, an outlet for discharging plastified thermoplastic synthetic resin;

a worm receiver in said cylinder and rotatable therein to plastify said thermoplastic synthetic resin and displace said thermoplastic synthetic resin from said inlet to said inlet, said worm comprising a metal worm shaft and fitted therearound with at least one helical rib; and means for high-frequency heating of said thermoplastic synthetic resin between said inlet and said outlet, said heating means including a high-frequency source connected across at least a portion of said worm shaft and of said helical rib thereby together forming a first electrode and said worm cylinder forming a second electrode.

2. The apparatus defined in claim 1 wherein said means for high-frequency heating of said thermoplastic synthetic resin includes an electrical insulator disposed between said electrodes.

3. The apparatus defined in claim 2 wherein said worm further comprises a worm body on said shaft and formed with said at least one helical rib.

4. The apparatus defined in claim 3 wherein said body is provided with an external coating forming said insulator.

5. The apparatus defined in claim 4 wherein said coating is an oxide ceramic.

6. The apparatus defined in claim 2 wherein said insulator is an oxide ceramic.

7. The apparatus defined in claim 6 wherein said cylinder is lined with a sleeve of said oxide ceramic.

8. The apparatus defined in claim 6 wherein said worm has an outer part formed from said oxide ceramic.

9. The apparatus defined in claim 6 wherein said worm has an external coating of said oxide ceramic.

10. The apparatus defined in claim 6 wherein said cylinder is coated with said oxide ceramic.

11. The apparatus defined in claim 2 wherein at least one of said electrodes is provided with a copper or silver coating.

12. The apparatus defined in claim 1 wherein said at least one helical rib is covered with an insulator separating said rib from electrical contact with said worm cylinder.

13. The apparatus defined in claim 1 further comprising a slide ring of electrical insulating material positioned between said extruder outlet and a downstream end of said worm shaft, said slide ring being provided with a check valve to prevent backflow of said thermoplastic synthetic resin when said worm is axially displaced to force said plastified thermoplastic synthetic resin into an injection mold.

* * * * *